United States Patent
Becocci

[19]

[11] Patent Number: 6,161,658

[45] Date of Patent: Dec. 19, 2000

[54] DISC BRAKE

[75] Inventor: Andrea Fiorenzo Becocci, Prato, Italy

[73] Assignee: Formula di Frati Daniela & C. S.A.S., Italy

[21] Appl. No.: 09/018,590

[22] Filed: Feb. 4, 1998

[30] Foreign Application Priority Data

Feb. 11, 1997 [IT] Italy ................................ FI970023 U

[51] Int. Cl.[7] .................................................. F16D 65/54
[52] U.S. Cl. ................... 188/71.8; 188/71.7; 188/73.45; 188/196 M
[58] Field of Search .............................. 188/71.7, 73.44, 188/73.45, 196 M, 73.41, 73.42, 73.43

[56] References Cited

U.S. PATENT DOCUMENTS

| | | | |
|---|---|---|---|
| 2,981,376 | 4/1961 | Zeidler | 188/196 M |
| 2,985,259 | 5/1961 | Gardner | 188/196 M |
| 3,765,511 | 10/1973 | Toyomasu . | |
| 3,998,295 | 12/1976 | Martin | 188/196 M |
| 4,228,875 | 10/1980 | Haraikawa et al. | 188/196 M |
| 4,537,288 | 8/1985 | Stoka . | |

FOREIGN PATENT DOCUMENTS

| | | | |
|---|---|---|---|
| 0 068 613 | 1/1983 | European Pat. Off. . | |
| 2 693 245 | 1/1994 | France . | |
| 1423843 | 9/1988 | U.S.S.R. | 188/71.7 |

*Primary Examiner*—Matthew C. Graham
*Attorney, Agent, or Firm*—McGlew and Tuttle, P.C.

[57] ABSTRACT

Disc brake comprising a caliper with two elements (8, 21) positioned on opposite sides with respect to a disc (D) integral with the hub of a wheel and each associated to a corresponding floating pad (19, 19) of friction material which faces a corresponding side of the disc (D). The orientation of the two pads being adjustable separately.

10 Claims, 1 Drawing Sheet

DISC BRAKE

FIELD OF THE INVENTION

The present invention refers to an improved disc brake, especially suitable for bicycles and motorcycles.

BACKGROUND OF THE INVENTION

Disc brakes for vehicles are known to comprise, essentially, a disc integral with a wheel, to which disc two gaskets or "pads" of friction material, such as lining, for example, are associated for position on opposite sides of the disc and able to be activated by means of corresponding coaxial hydraulic pistons, the latter being suitably associated to a hydraulic operating circuit so as to cause, under braking condition, the clamping of the disc, operated by the pads simultaneously pushed by the respective pistons, and the dissipation of kinetic energy by virtue of the friction exerted by the same pads on the disc of each wheel.

Also known are conventional disc brakes in which the pads are in constant contact with the disc surface, that is, even when the pistons are deactivated. This implies a constant and unwanted dissipation of kinetic energy during the running of the vehicle, which causes and reduction of mechanical efficiency of the vehicle and results exceedingly detrimental in case of bicycles, especially of race model, inasmuch as the cyclist must exert an additional effort to win the thus provided resistance to the rotation of the wheel.

SUMMARY AND OBJECTS OF THE INVENTION

The main object of the present invention is to overcome the drawbacks and to provide an apparatus which is relatively simple to make, cost-effective and reliable.

This result has been achieved, according to the invention, by providing an apparatus having a housing with a housing pin fixable to a support, such as the chassis of a vehicle. The housing is slidably connected to the housing pin, and a spring biases the housing to a pre-determined housing position with respect to the housing pin. First and second brake pads are connected to the housing, with the first brake pad being connected by a hydraulic piston cylinder unit to the housing. A disk is rotatably positioned between the first and second brake pads. A position adjustment means adjusts the pre-determined housing position. The position adjustment means is preferably an adjustable stop in the form of a nut axially moveable on the housing pin. This adjustable stop stops movement of the housing on the housing pin. Further characteristics being set forth in the dependent claims.

The advantages deriving from the present invention will be better understood by anyone skilled in the art through a reading of the following description in conjunction with the accompanying drawing given as a practical exemplification of the invention, but not to be considered in a limiting sense.

The only FIGURE represents a view in vertical section of a disc brake according to the invention.

DETAILED DESCRIPTION OF THE PREFERRED EMBODIMENTS

Figure 1:
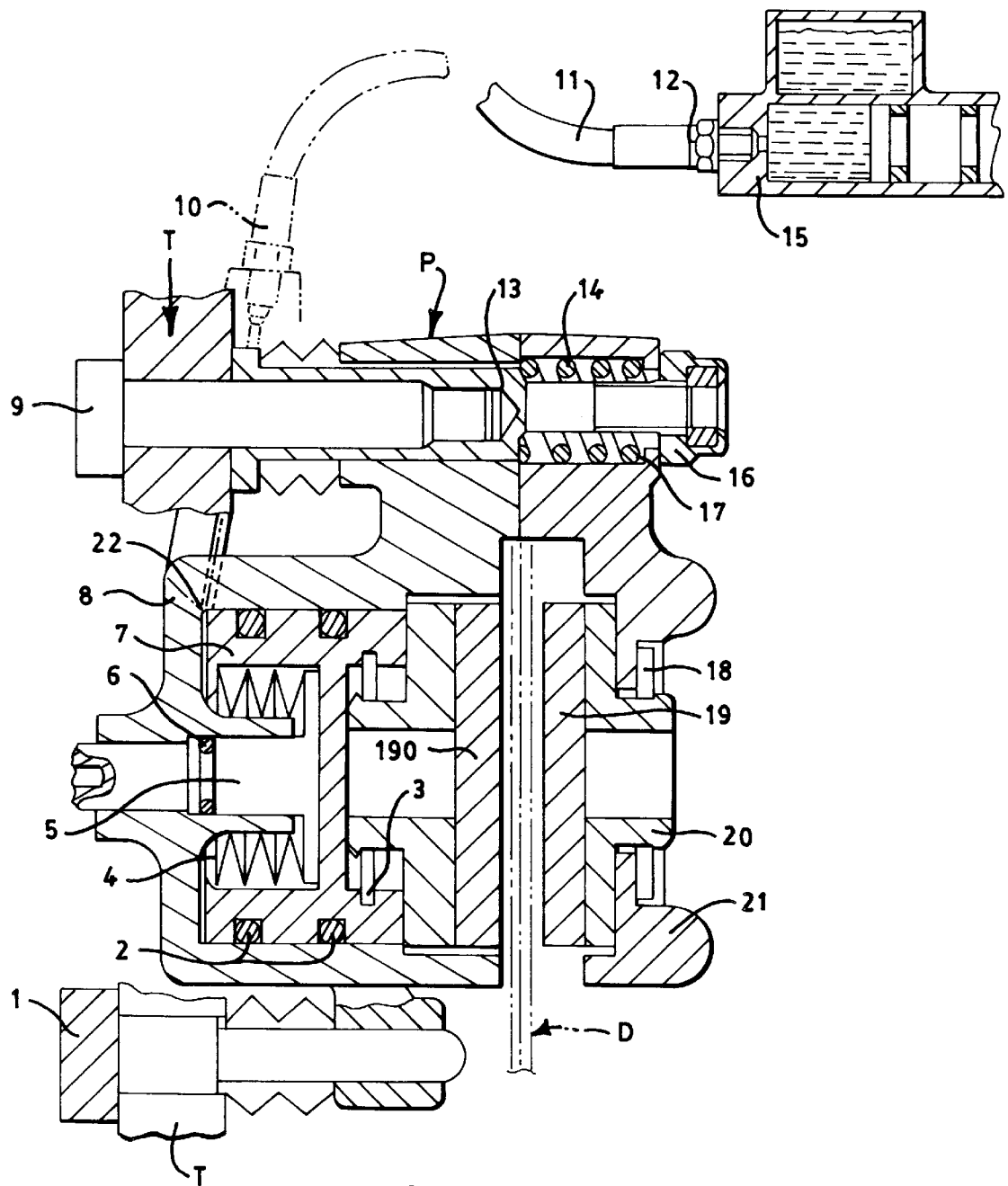

Reduced to its basic structure, and reference being made to FIG. 1 of the attached drawings, an improved disc brake according to the invention comprises a caliper with two housing elements (8, 21) positioned on opposite sides with respect to a disc (D) integral with the hub of a wheel—not shown on the drawing—and each being associated to a corresponding floating pad (19, 190) of friction material parallel to the disc (D), so that each pad will face a corresponding side of the disc (D) in order to result in contact therewith under braking conditions and spaced apart therefrom by a given distance under running conditions. The caliper is made integral with a support such as the chassis (T) of the vehicle by means of screws (9, 1) which, in the embodiment shown in FIG. 1, are provided in correspondence of the primary and secondary connections, respectively, of the caliper. To adjust the distance of the element (21), that is, of the corresponding pad (19), from the disc (D), a housing pin (13) is used which is borne by the chassis (T) and on which the primary connection (P) is slidingly mounted, the latter being kept in place by a spring (14) interposed between the two elements (8, 21) of the caliper and, more particularly, positioned inside the element (21), guided by the pin (13) and cooperating with a respective pin provided with adjusting nut (16) located on opposite side of the pin (13), the pin (13) and spring (14) being oriented parallel to the axis of rotation of the disc (D), By acting on the nut (16) there is obtained the adjustment of the preloading of spring (14) and the position of the element (21) of the caliper together with pad (19), with respect to the disc (D). Numeral (17) indicates a bush for supporting the base of spring (14). To make the pad (19) floating, this is supported by a plate (20) fitted with clearance within an corresponding hole of the element (21) and retained in its seat by a snap ring (18). The pad (190) of the other element (8) of the caliper is associated to a hydraulic piston (7) with axis parallel to the axis of rotation of disc (D), whose activation is operated by a pump (15) and which is slidingly mounted within a corresponding seat of the element (8) with the aid of two retaining rings (2). Associated to the piston (7) is a corresponding counteracting spring (4) with coaxial pad pin (5) to adjust the distance of the pad (190) from disc (D). Numeral (11) indicates a pipe for delivering fluid from the pump (15) to the element (8) of the caliper to which a connection (12) in correspondence of the pump (15) and a connection (10) in correspondence of the element (8) are associated.

The operation of the described apparatus is as follows.

When the pump (15), operated by the cyclist upon acting on the brake, delivers fluid under pressure to the piston (7)—the section for the admission of the fluid into the element (8) of the caliper being indicated with (22) in FIG. 1—this translates in the direction of its longitudinal axis, thereby causing the respective pad (190) to move towards the disc (D). Once the condition of complete approach of the pad (190) to the disc (D) has been reached, and when the force exerted thereon is sufficient to win the resistance of the spring (14), the reaction of the latter causes the element (21) with pad (19) to move close to the disc (D) until the complete contact and the compression of the pad onto the disc are achieved. Thus, the braking action exerted by the apparatus on the wheel begins. When the hydraulic pressure stops, the piston (7) is brought back to its initial position of detachment of the pad (190) from the disc (D) by the action of the spring (4), thereby allowing the spring (14) to resume the initial configuration and release, therefore, the disc (D) from the action of pad (19) which, likewise the pad (190), moves itself back to the starting condition through the effect of the corresponding backward movement of the element (21).

The possibility of separately adjusting, within a floating caliper, the position of the two pads (19, 190) allows the brake to be predisposed in a configuration most suited to meet the specific requirements of any cyclist, for example, the response time related to the expected or ascertained conditions for a ride or a race, to the nature of the material of the pads (19, 190) and to the degree of wear of each pad.

The above described apparatus is relatively simple to make, cost-effective and reliable evan after a prolonged servive life.

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent for industrial invention.

What is claimed is:

1. A disc brake comprising:

a housing;

a housing pin fixable to a support, said housing being slidably connected to said housing pin;

a pin spring biasing said housing to a predetermined housing position with respect to said housing pin;

first and second brake pads connected to said housing;

a disc positioned between said first and second brake pads;

a piston cylinder unit connected to said housing and said first brake pad, said piston cylinder unit moving said first brake pad toward said disc;

position adjustment means for adjusting said predetermined housing position;

a pad spring for biasing said first brake pad in a first brake pad position with respect to said housing, said piston cylinder unit includes a pad pin for selectively adjusting said first brake pad position.

2. The brake in accordance with claim 1, wherein:

said position adjusting means forms an adjustable stop for movement of said housing on said housing pin.

3. The brake in accordance with claim 1, wherein:

said position adjustment means includes a nut axially movable on said housing pin.

4. The brake in accordance with claim 2, wherein:

said position adjustment means includes a nut axially movable on said housing pin.

5. The brake in accordance with claim 1, wherein:

said pin spring biases said housing against said stop, said predetermined housing position of said housing being against said stop.

6. The brake in accordance with claim 1, wherein:

said pin spring biases said housing in a direction substantially opposite a direction said piston cylinder unit applies to said housing.

7. The brake in accordance with claim 1, wherein:

the support is a chassis of a vehicle;

said housing includes two elements and said pin spring is positioned between said two elements;

said position adjustment means includes a nut on an end of said housing pin opposite the support, said nut being axially movable on said housing pin for changing a bias force of said pin spring;

said disc being rotatable about a disc rotation axis, said housing pin and said pin spring having a longitudinal axis substantially parallel to said disc rotation axis;

said piston cylinder unit is a hydraulic unit under control of a pump for adjustment of said first brake pad.

8. The brake in accordance with claim 1, wherein:

said pad spring biases said first brake pad in a direction substantially opposite a direction said piston cylinder unit moves said first brake pad, said pad pin adjusts a distance of said first brake pad position from said disc.

9. The brake in accordance with claim 1, wherein:

said pin spring is positioned in said housing and is guided by said housing pin.

10. A disc brake comprising:

a housing;

a housing pin fixable to a support, said housing being slidably connected to said housing pin;

a pin spring biasing said housing to a predetermined housing position with respect to said housing pin;

first and second brake pads connected to said housing;

a disc positioned between said first and second brake pads;

a piston cylinder unit connected to said housing and said first brake pad, said piston cylinder unit moving said first brake pad toward said disc;

position adjustment means for adjusting said predetermined housing position;

a pad spring for biasing said first brake pad in a direction substantially opposite a direction said piston cylinder unit moves said first brake pad, said piston cylinder unit includes a pad pin for selectively adjusting a distance of said first brake pad position from said disc.

* * * * *